United States Patent
Houck

(10) Patent No.: US 12,241,245 B2
(45) Date of Patent: Mar. 4, 2025

(54) CONCRETE FASTENER INSTALLATION USING LOW VISCOSITY ADHESIVE

(71) Applicant: Simpson Strong-Tie Company Inc., Pleasanton, CA (US)

(72) Inventor: Joel Houck, Cedar Lake, IN (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 329 days.

(21) Appl. No.: 17/491,342

(22) Filed: Sep. 30, 2021

(65) Prior Publication Data

US 2023/0101501 A1    Mar. 30, 2023

(51) Int. Cl.
*F16B 13/14* (2006.01)
*E04B 1/41* (2006.01)

(52) U.S. Cl.
CPC .......... *E04B 1/4157* (2013.01); *F16B 13/142* (2013.01); *F16B 2013/148* (2013.01)

(58) Field of Classification Search
CPC . E04B 1/4157; F16B 13/142; F16B 2013/148
See application file for complete search history.

(56) References Cited

U.S. PATENT DOCUMENTS

| | | | |
|---|---|---|---|
| 4,595,315 A | 6/1986 | Gallagher, Jr. | |
| 5,288,767 A | 2/1994 | Cramer et al. | |
| 5,426,130 A | 6/1995 | Thurber et al. | |
| 6,402,434 B1 | 6/2002 | Surjan et al. | |
| 2016/0102697 A1* | 4/2016 | Goettlich | F16B 25/0026 411/82 |
| 2020/0284028 A1 | 9/2020 | Fujita | |

FOREIGN PATENT DOCUMENTS

| | | |
|---|---|---|
| CA | 3148343 | 4/2021 |
| JP | 2005213280 A | 8/2005 |
| JP | 2008-169286 | 7/2008 |
| JP | 2012-62706 | 3/2012 |
| WO | 2021096556 | 5/2021 |

OTHER PUBLICATIONS

International Search Report and Written Opinion dated Jan. 20, 2023, International Patent Application No. PCT/US2022/045170.
International Preliminary Report on Patentability dated Apr. 11, 2024, International Patent Application No. PCT/US2022/045170, 7 pages.
Examination Report dated Jan. 10, 2025, Australian Patent Application No. 2022354880, 3 pages.

* cited by examiner

*Primary Examiner* — Vishal I Patel
(74) *Attorney, Agent, or Firm* — Pearl Cohen Zedek Latzer Baratz LLP

(57) ABSTRACT

A method for installing fastener in a base material. The fastener has a shank having a first end and a second end defining a length, a head provided at the second end, and a thread provided on the shank which includes a leading edge and a trailing edge adapted remove portions of the base material when inserted into the base material. The method includes forming a hole having a diameter which is a nominal shank diameter of the fastener to be installed in the base material. The hole is then filled with an adhesive having a viscosity of 350 cP or less. Finally, the fastener is rotated into the hole such that the adhesive is forced into portions of the base material adjacent to the shank and thread when the thread is fully inserted into the hole.

6 Claims, 9 Drawing Sheets

CONCRETE FASTENER INSTALLATION USING LOW VISCOSITY ADHESIVE

TECHNICAL FIELD

The present technology relates to a thread-tapping fastener, and in particular a concrete fastener, and improvements to the installation thereof.

BACKGROUND

Thread-tapping concrete screws are screwed into holes drilled into a construction material, especially concrete, without the use of a plug. Normally, as the screw is being screwed in, the screw works its way into the construction material in such a way that the thread taps or cuts a mating thread into the construction material. Therefore, the screw itself cuts the thread or mating thread needed for the required positive fit between the thread and the construction material.

When the thread-tapping screw is being screwed into a drilled hole, stone powder from the construction material is formed in the area of the end of the screw. The stone powder can result from not being completely removed from the drilled hole after the hole was made and/or the stone powder is formed when the thread-tapping screw is being screwed into the drilled hole in the area of the end of the screw.

Over time, cracks may develop in installations of a fastener in concrete which can be repaired by adhesives and some fasteners have, in the past, been installed using adhesives.

SUMMARY

Described herein is a method for installing fastener in a base material. The fastener has a shank having a first end and a second end defining a length, a head provided at the second end, and a thread provided on the shank which includes a leading edge and a trailing edge adapted remove portions of the base material when inserted into the base material. The method includes forming a hole having a diameter which is a nominal shank diameter of the fastener to be installed in the base material. The hole is then filled with an adhesive having a viscosity of 350 cP or less. Finally, the fastener is rotated into the hole such that the adhesive is forced into portions of the base material adjacent to the shank and thread when the thread is fully inserted into the hole.

A fastening structure is also described. The structure includes a base material, a hole having a diameter which is a nominal shank diameter of the fastener to be installed in the base material and a fastener in a bore in the base material. The fastener comprises a shank having a first end and a second end defining a length, a head provided at the second end and adjacent to a top surface of the base material, a thread provided on the shank which includes a leading edge and a trailing edge adapted remove portions of the base material when inserted into the base material, the thread embedded in the base material along a length of the bore. An adhesive having an installation viscosity of 350 cP or less is embedded into the base material adjacent to the walls of the bore and the embedded threads of the fastener.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Improvements in a method for installing fastener in a base material are described. The fastener has a shank with a thread provided on the shank which includes a leading edge and a trailing edge adapted remove portions of the base material when inserted into the base material. The method includes forming a hole having a diameter which is a nominal shank diameter of the fastener to be installed in the base material. The hole is then filled with an adhesive having a viscosity of 350 cP or less and in one embodiment 150 cP or less, and the fastener is rotated into the hole such that the adhesive is forced into portions of the base material adjacent to the shank and thread when the thread is fully inserted into the hole.

Figure 1:
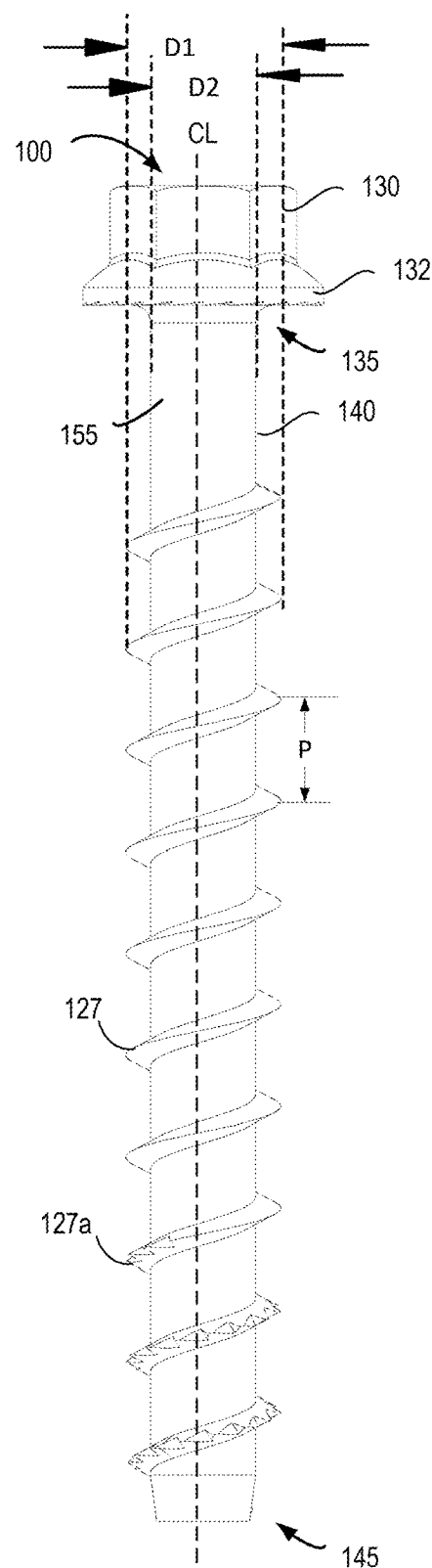
FIG. 1 illustrates a plan view of a concrete fastener 100 which may be installed into a pre-drilled drilled in concrete.

FIG. 1 illustrates a plan view of a concrete fastener 100 which may be installed into a pre-drilled drilled in concrete.

The fastener 100 has a fastener head comprising nut 130 and washer 132 at one end of a fastener shank 140. A thread 127 is provided on the fastener shank 140. Shank 140 has a section 155 that is configured without a thread 127. The section 155 transitions to integral washer 132 and nut 130 at 135. The shank 140 has a root or nominal diameter D2 of the fastener shank 5 as well as an outer diameter D1 on the thread 127. The thread 127 also has a pitch P, which corresponds to the distance between any two windings of the thread 127. The fastener 100 is inserted in a pre-drilled hole having a diameter matching or slightly larger than a shank of the fastener.

A front section 127a of the fastener 100 starts at the fastener end 145 and runs in the direction of a longitudinal axis CL of the fastener 100 towards the fastener head. The front section 127a in this embodiment encompasses approximately two windings of the thread 127.

While the fastener 100 of FIG. 1 is suitable for use with the present technology, any of the fastener embodiments disclosed in U.S. patent application Ser. No. 17/246,247 entitled "Concrete Fastener", filed 20 Apr. 2021, inventor Joel Houck, specifically incorporated by reference herein in its entirety, may be utilized in accordance with the installation techniques described herein.

Embodiments of the fastener of application Ser. No. 17/246,247 may include: a fastener having a flat-topped thread; and/or a shank detent region; and/or a variable length shank detent region; and/or a fastener having a variable depth shank detent region; and/or a thread with a first thread angle in a region adjacent to the tip or leading end of the fastener and a second, smaller thread angle in a region between the first thread angle and the second end of the fastener and/or one or more flutes at the tip of the fastener; and/or a tri-obular thread; and/or a portion of the thread novel saw-tooth thread having a triangular leading edge followed by a shell-shaped trailing edge; and/or a dual lead thread at the tip of the fastener.

Figure 2:
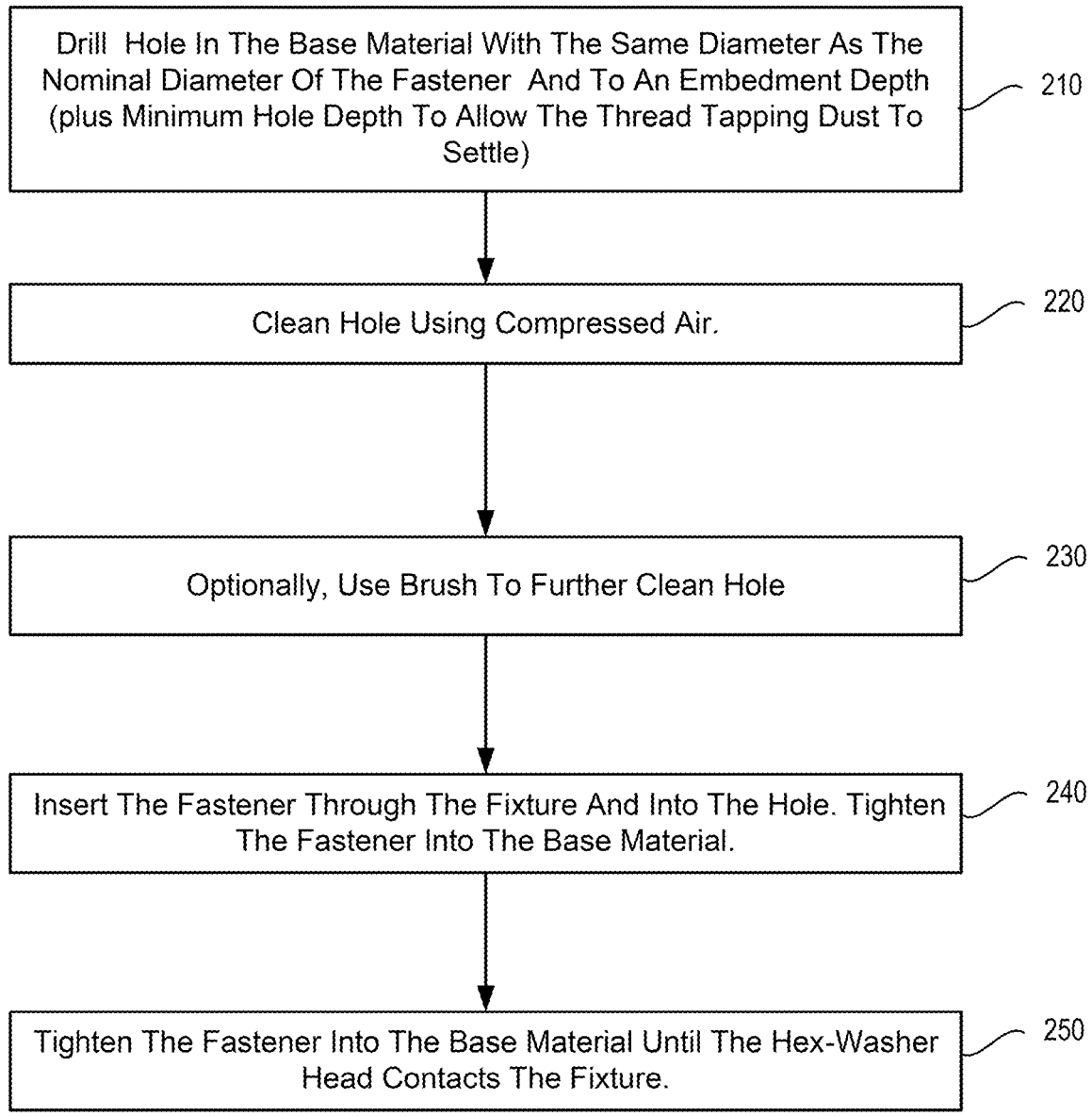
FIG. 2 is a flow chart illustrating a method for installing a fastener such as that shown in FIG. 1.

FIG. 2 illustrates a method for installing the fastener 100 of FIG. 1 or any of the fastener embodiments illustrated in application Ser. No. 17/246,247. FIG. 2 will be described with reference to FIGS. 3-7 which are partial, cutaway views illustrating the steps of a fastener installation method of FIG. 2.

Figure 3:
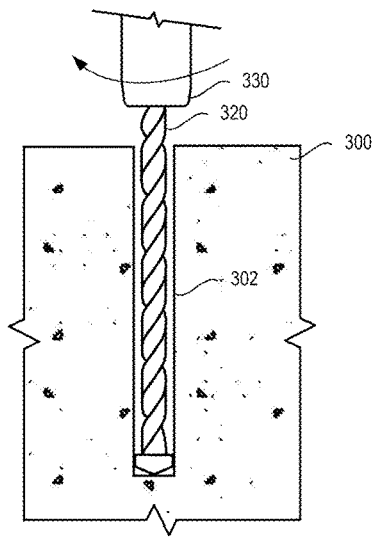
FIGS. 3-7 are partial, cutaway views illustrating the steps of a fastener installation method of FIG. 2.

At step 210, an installer will drill a bore 302 in the base material 300 using, for example, a Carbide drill bit, with the hole drilled to have the same diameter as the nominal diameter of the fastener to be installed. The bore 302 is drilled to a specified minimum hole depth to accommodate the fastener any thread tapping dust which is not removed by cleaning the bore. This is illustrated in FIG. 3 which illustrates the base material 300 having a bore 302 drilled therein by a drill bit 320 coupled to a drill chuck 330.

Figure 4:
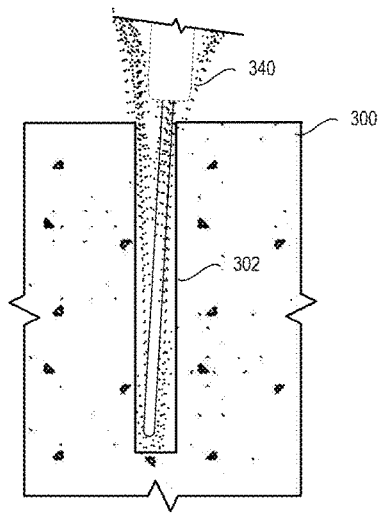
Figure 5:
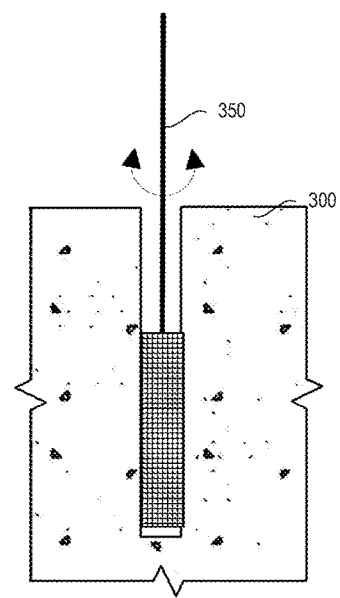
Figure 6:
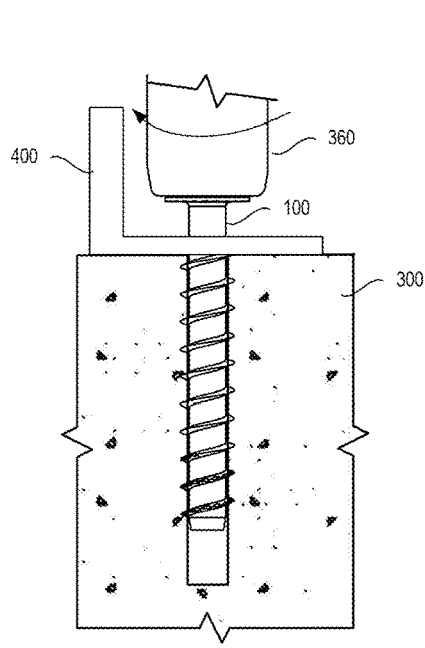
Figure 7:
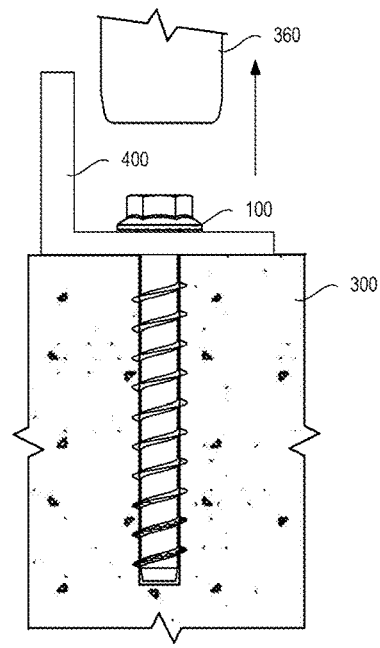

At 220, the hole is clean using, for example, compressed air. This is illustrated in FIG. 4 which shows a portion of the compressed air canister 340 having a cannula delivering forced are into the bore to blow particulate out of the bore 302. Alternatively, or in addition to step 220, the bore 302 can be drilled deep enough to accommodate the fastener depth and any dust which results in drilling and tapping without the forced air cleaning at 220. At 230, and as illustrated in FIG. 5, a brush 350 may be utilized to further clean the bole 302 such as, for example, by rotating the bus back and forth within the bore 302. At 240, the fastener 100 is inserted through a fixture 400 and into the bore 302. The fasteners is then tightened into the base material using a powered fastening tool at step 250 as illustrated in FIG. 6. At 250, the fastener is tightened into the base material 300 until the washer head portion of the fastener contacts the fixture 400 as illustrated in FIG. 7.

Figure 8:
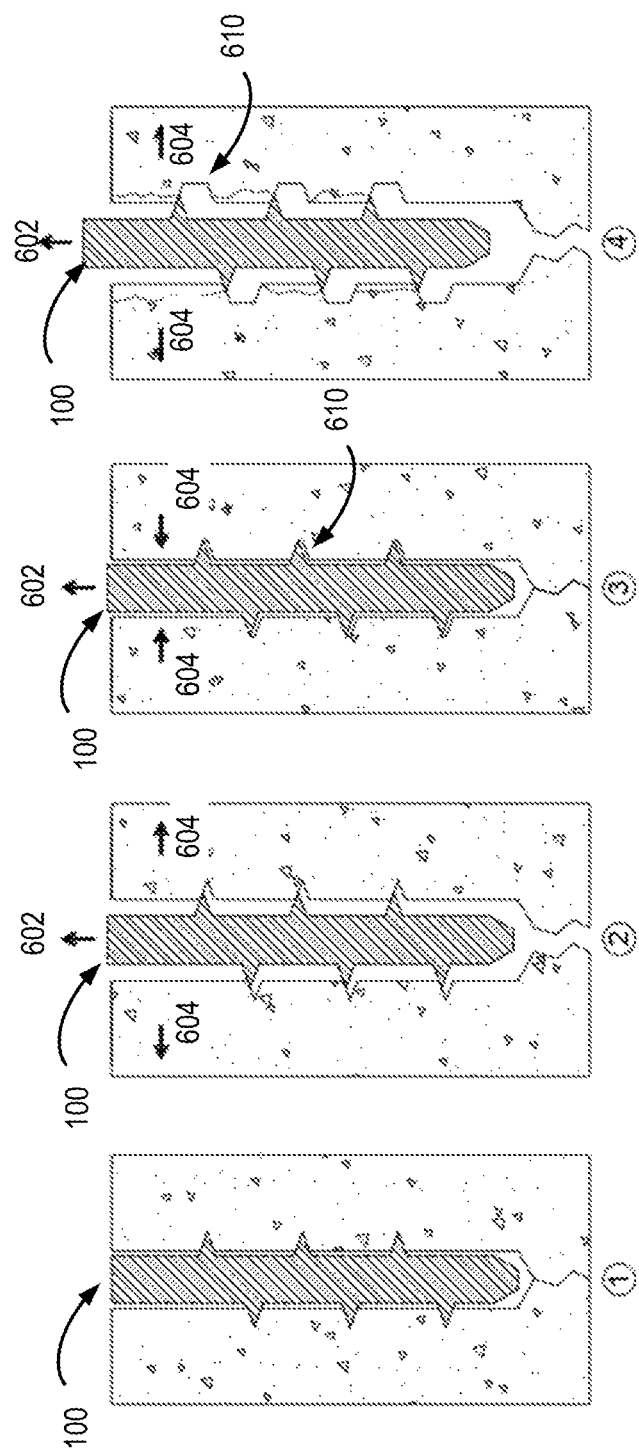
FIG. 8 are sequences illustrating the effect of pullout forces on the fastener disclosed in FIG. 1 over time.

FIG. 8 shows four cross-sectional views of fastener 100 illustrating the pull-out effect on a cracked concrete substrate when the fastener has an angled top surface at four stages (labeled 1 through 4 in FIG. 8) illustrating the effect of pullout forces on the embodiments of fasteners disclosed in FIG. 1 over time.

At stage 1 of FIG. 8, the fastener 100 is at rest in a concrete slab, having been installed in the pre-drilled hole. A crack has formed in the concrete due to external forces acting on the concrete, and the crack has intersected the fastener location. As a pull-out force 602 is exerted on the fasteners at stage 2 in FIG. 8, lateral forces 604 are exerted by external forces acting on the concrete, causing some separation in the concrete slab away from the fastener. At this stage the angle on the top of the thread along with the pullout force on the fastener causes the fastener to slip upwards in the hole. As illustrated at stage 3, the removal of the external load along with the elasticity of reinforcing bars embedded in the concrete will cause the concrete to move back toward the fastener as the pull out force 602 remains constant. Because the fastener has already slipped up in the hole, the concrete is crushed slightly at the top of the thread as the concrete returns to its original position. Note that at stage 3 of FIG. 8, some separation 610 begins to occur between the thread groove in the concrete slab and the thread of the fastener, loosening the strength of the fastener in the slab. Over time, this results in an enlarged separation 610 as shown at stage 4 of FIG. 8.

The technology of the present disclosure helps increase the resistance to pull out described with respect to FIG. 8.

Figure 9:
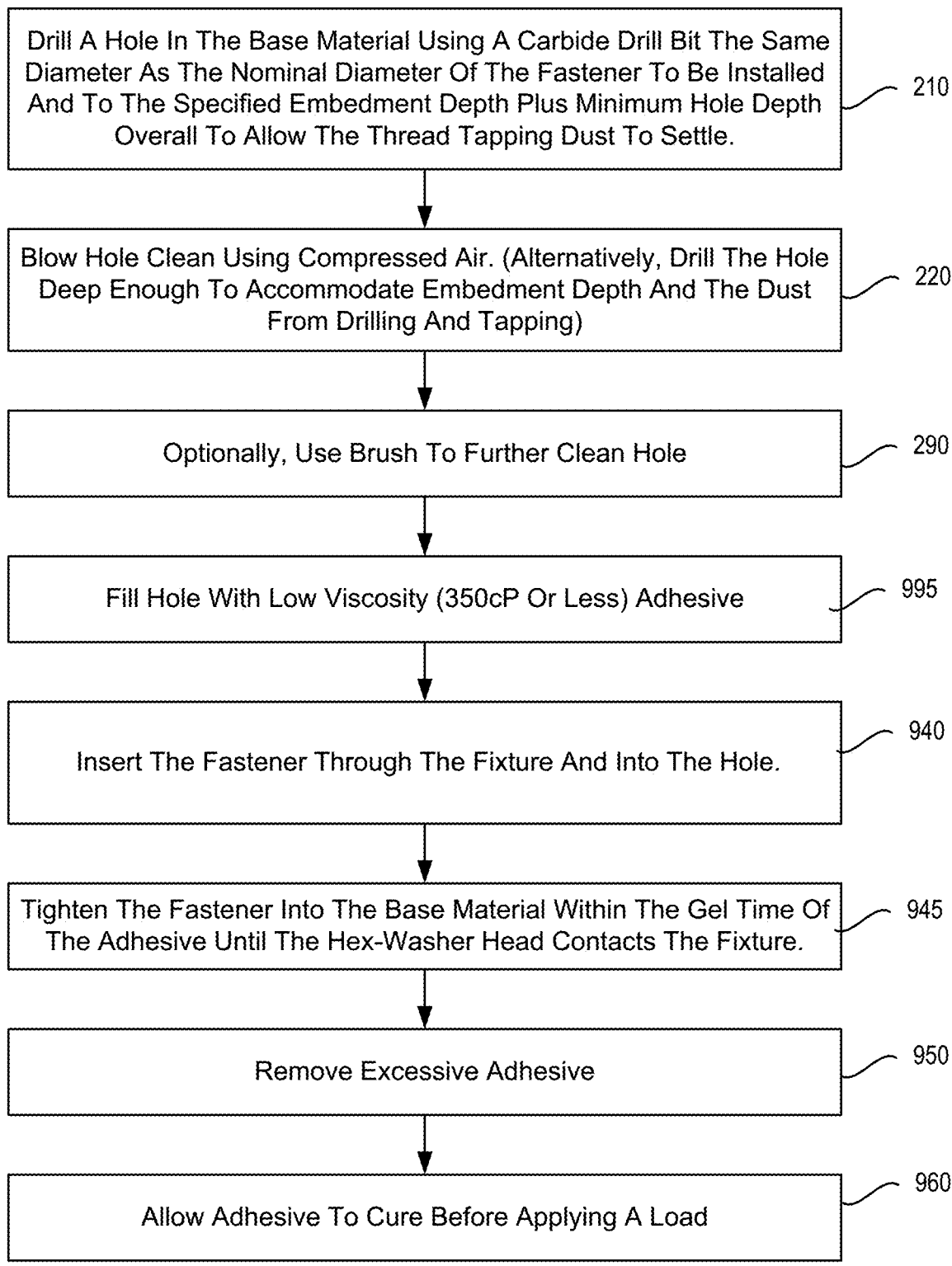
FIG. 9 is a flow chart illustrating a method for installing a fastener such as that shown in FIG. 1.

FIG. 9 illustrates a method for installing the fastener 100 of FIG. 1 or any of the fastener embodiments illustrated in application Ser. No. 17/246,247 in accordance with the present technology. FIG. 9 will be described with reference to FIGS. 3-5, and 10-12 which are partial, cutaway views illustrating the steps of a fastener installation method of FIG. 9.

Figure 10:
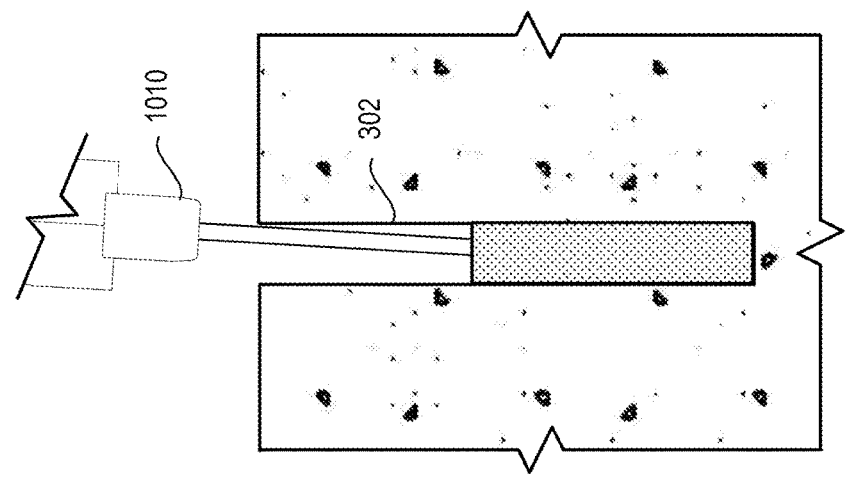

In the method of FIG. 9, steps 210, 220 and 230 are performed in the same manner as described above and as illustrated in FIGS. 3-5. Prior to installing the fastener in the bore, at 995, a quantity of low-viscosity adhesive is applied into the bore. In one embodiment, the adhesive may comprise low-viscosity structural injection epoxy having a viscosity of 350 cP or less. For example, a two-component, high-modulus, high-solids, moisture-tolerant epoxy designed for pressure injection, gravity feeding and flood coat filling of concrete cracks such as CI-LV Low-Viscosity Injection Epoxy having a viscosity of 350 cP available from Simpson Strong-Tie was found effective in performing the installation method disclosed herein. In another embodiment, CI-SLV Super-Low-Viscosity Injection Epoxy having a viscosity of 150 cP, also available from Simpson Strong-Tie, may be utilized. As illustrated in FIG. 10, the adhesive may be injected into bore 302 using an injection gun 1010.

Next, at 940, the fastener 100 is inserted into the bore having the adhesive therein and tightened at 945 within the gel-time specified for the adhesive. A typical gel-time for such an adhesive is approximately 40 minutes. During the tightening process, some adhesive may extrude from the bore and at 950, the excess adhesive should be removed. At 960, the adhesive should be allowed to cure before applying a load to the fixture 400 fastened by the fastener 100.

Figure 12:
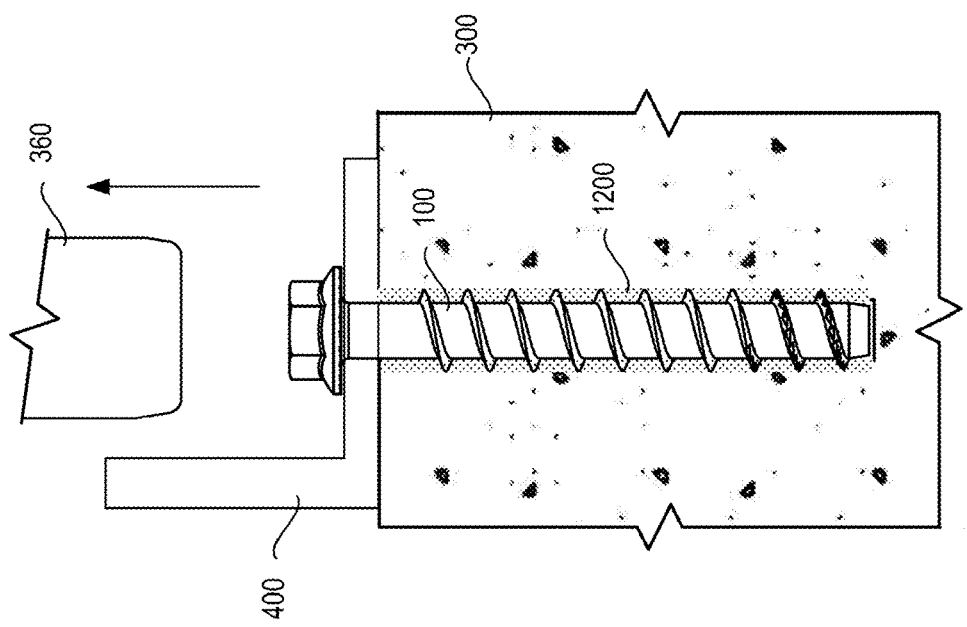
FIGS. 10-12 are partial, cutaway views illustrating the steps of a fastener installation method of FIG. 9.
Figure 11:
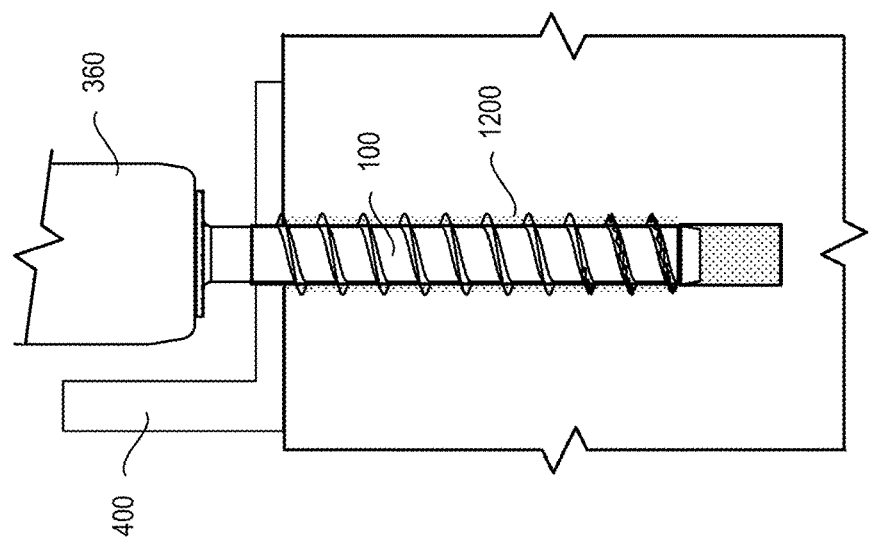

The resulting structure has a portion 1200 of the adhesive lining the bore. As illustrated in FIG. 12, some adhesive may penetrate the concrete walls at the bottom of the bore and adjacent to the walls of the bore. Normally, the low-viscosity adhesives described herein are utilized for injection into of cracks in structural concrete, as the low-viscosity epoxy is suitable for repair of hairline cracks (0.002") and cracks up to ¼" (6 mm) in width. When the fastener is installed using the low-viscosity adhesive in the disclosed method, the displaced adhesive is forced up against the walls of the bore 302 where it can seep into the concrete, reinforcing the surface where the fastener threads are engaged. When the crack opens and closes in the concrete, the surface that rubs against the threads is much harder than the bare concrete, so there is less crushing of the concrete. This results in much higher performance in this condition than without the adhesive as illustrated in the below graphs.

Alternative adhesives may be utilized in accordance with the method and the amount of seepage or penetration of the adhesive into the concrete varies with the composition of the adhesive. As such, there are three possible conditions for the adhesive in the bore based on the viscosity; most or all of the adhesive seeps into the concrete with the remainder filling some of the annular space between the screw shank and the concrete; the adhesive fills the annular space between the fastener and the concrete with some seeping into the concrete to reinforce it; and the adhesive fills the annular space between the screw shank and the concrete with none seeping into the concrete. Testing results on different fasteners, some of which are described below, found that a 150 cP adhesive used in the disclosed method performed better than a 350 cP adhesive, though the 350 cP adhesive nevertheless improved pull-out performance over fasteners installed without using the method. Adhesives with viscosities even less than 150 cP can also be utilized in the method.

Figure 13:
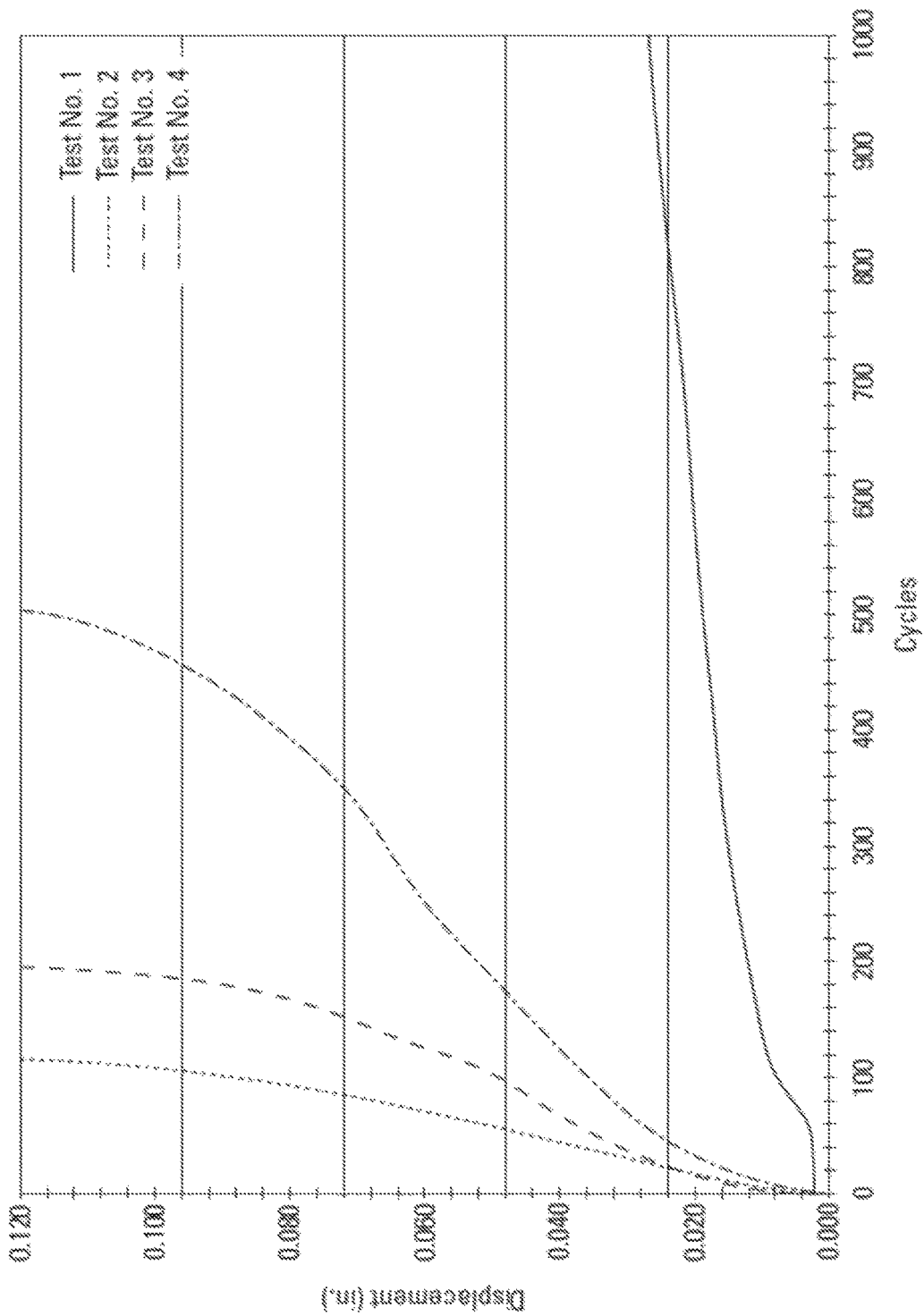
FIG. 13 is a crack cycling graph of the fastener of FIG. 1 installed using the method of FIG. 2.
Figure 14:
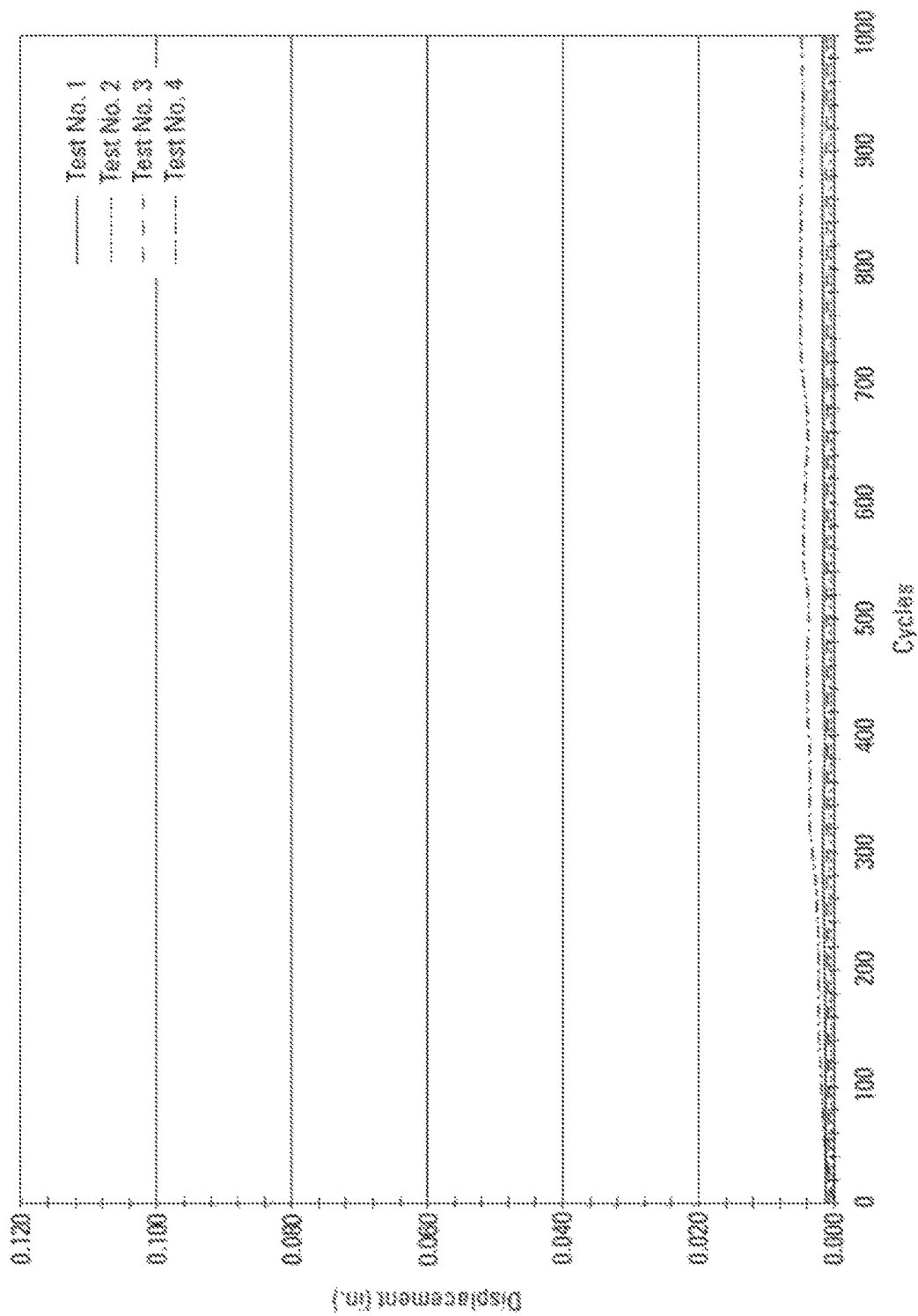
FIG. 14 is a crack cycling graph of the fastener of FIG. 1 installed using the method of FIG. 9.

FIGS. 13 and 14 are crack cycling graphs of the displacement of a fastener which result from testing various methods of installation on the fastener of FIG. 1 using an adhesive with a 150 cP viscosity. FIG. 13 illustrates displacement of a fastener over a number of stress cycles where a fastener 100 is installed using the method of FIG. 2 where no adhesive was used during installation. FIG. 14 illustrates displacement of a fastener installed where low-viscosity adhesive was used during installation (the method of FIG. 9).

As illustrated in FIG. 13, the displacement of the fastener ramps up quickly in as few as 10-20 cycles in certain tests. Using the method of FIG. 9, displacement is less than 0.01 inch even after hundreds of cycles.

Embodiments of the fastener are suitable for insertion into a concrete material having a pre-formed bore of sufficient diameter to accommodate a diameter of the shank and for forming a self-threaded grooves in the bore in the concrete material.

Figure 15:
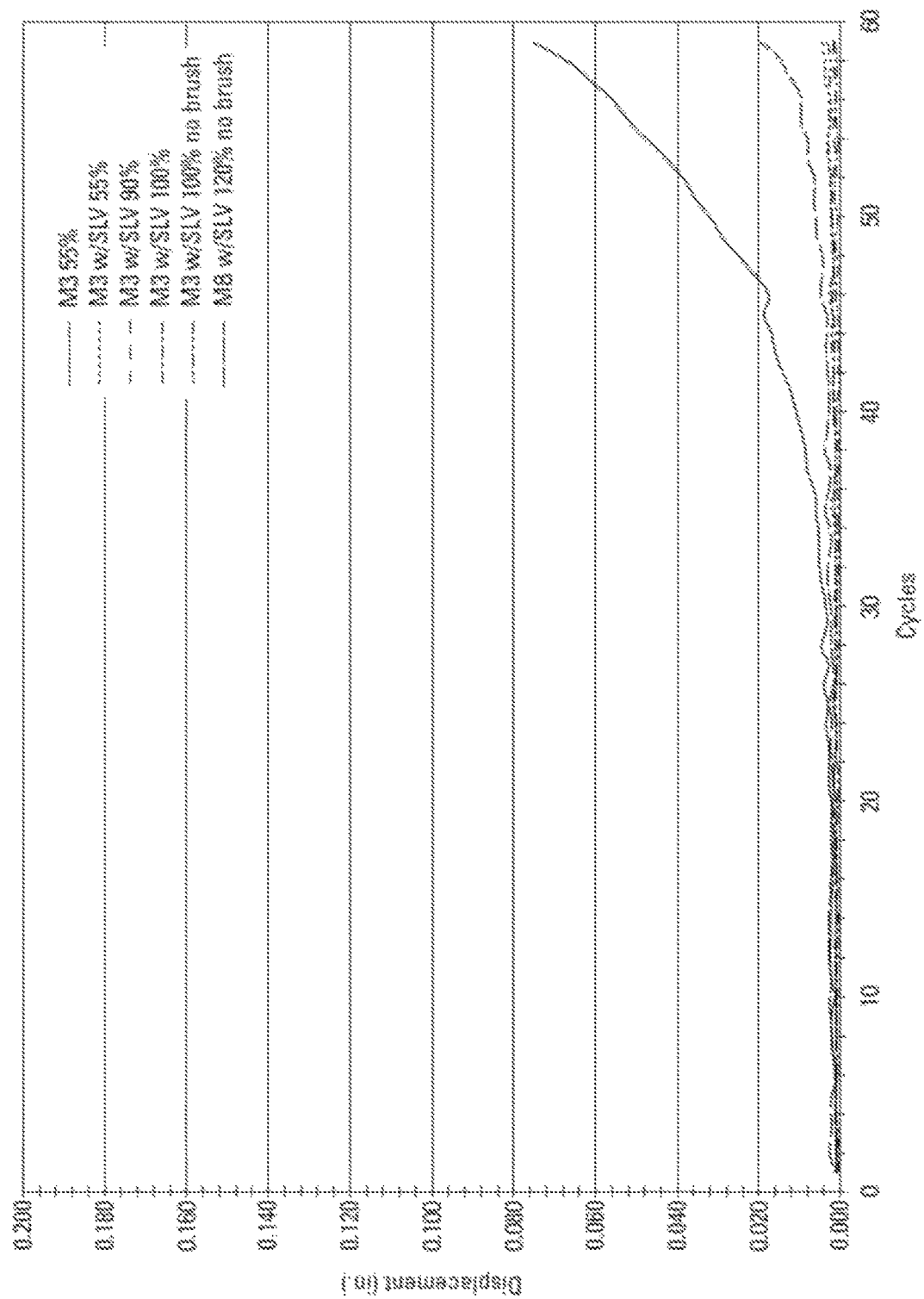
FIG. 15 is a stepwise crack cycling graph comparing installation of the fastener of FIG. 1 and that of application Ser. No. 17/246,247 installed using the method of FIGS. 2 and 9.

FIG. 15 illustrates a comparison of the displacement of a fastener such as that disclosed in application Ser. No. 17/246,247, FIGS. 3 and 4 thereof, where the top edge of the thread of the fastener has a flat top edge (M8) versus fastener 100 (M3). The graph illustrates the displacement for fasteners during a stepwise crack cycling test where the installation comprised: fastener 100 using the method of FIG. 2 with a 55% total force ("M3 55%"); fastener 100 using the method of FIG. 9 with a 55% total force ("M3 w/SLV 55%"); fastener 100 using the method of FIG. 9 with a 90% total force ("M3 w/SLV 90%"); fastener 100 using the method of FIG. 9 with a 100% total force ("M3 w/SLV 100%"); fastener 100 using the method of FIG. 9 with a 100% total force without brushing the bore ("M3 w/SLV 100% no brush"); and fastener of application Ser. No. 17/246,247 using the method of FIG. 9 with a 120% total force and not brush cleaning ("M8 w/SLV 120% no brush"). As illustrate in FIG. 15, even without cleaning the bore, the adhesive installation method disclosed herein provides improved resistance to displacement over prior installation methods and substantially improves the performance of numerous types of concrete fasteners.

All such embodiments of fasteners discussed herein benefit from the use of the installation methods described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for installing fastener in a base material, the fastener comprising a shank having a first end and a second end defining a length, a head provided at the second end, a thread provided on the shank which includes a leading edge and a trailing edge adapted remove portions of the base material when inserted into the base material, the method comprising:
   forming a hole having a diameter which is the same as a nominal shank diameter of the fastener to be installed in the base material;
   filling the hole with an adhesive having a viscosity of less than 150 cP using an injection gun;
   causing the fastener to be rotated into the hole such that the adhesive is forced into portions of the base material adjacent to the shank and thread when the thread is fully inserted into the hole.

2. The method of claim 1 wherein causing step is performed prior to an expiration of a gel time of the adhesive.

3. The method of claim 1 further including cleaning the hole prior to the filling step using forced air.

4. The method of claim 1 further including cleaning the hole prior to the filling step using a brush.

5. The method of claim 1 further including allowing the adhesive to cure.

6. The method of claim 1 wherein the base material is concrete.

* * * * *